US012665977B2

(12) United States Patent
Otsuka et al.

(10) Patent No.: US 12,665,977 B2
(45) Date of Patent: Jun. 23, 2026

(54) IMAGING APPARATUS AND INFORMATION PROCESSING METHOD

(71) Applicant: Panasonic Intellectual Property Management Co., Ltd., Osaka (JP)

(72) Inventors: Koichi Otsuka, Osaka (JP); Takaaki Yamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 70 days.

(21) Appl. No.: 18/804,206

(22) Filed: Aug. 14, 2024

(65) Prior Publication Data

US 2025/0071433 A1 Feb. 27, 2025

(30) Foreign Application Priority Data

Aug. 23, 2023 (JP) ................................. 2023-135696

(51) Int. Cl.
| | |
|---|---|
| *H04N 5/262* | (2006.01) |
| *H04N 23/62* | (2023.01) |
| *H04N 23/63* | (2023.01) |
| *H04N 23/84* | (2023.01) |

(52) U.S. Cl.
CPC ........... *H04N 5/2621* (2013.01); *H04N 23/62* (2023.01); *H04N 23/631* (2023.01); *H04N 23/84* (2023.01)

(58) Field of Classification Search
None
See application file for complete search history.

(56) References Cited

U.S. PATENT DOCUMENTS

| | | | | |
|---|---|---|---|---|
| 9,602,739 | B1* | 3/2017 | Hodges | ................ H04N 5/2621 |
| 2010/0290447 | A1 | 11/2010 | Sakai | |
| 2012/0057051 | A1* | 3/2012 | Ito | ......................... H04N 23/631 |
| | | | | 348/E5.051 |
| 2023/0209176 | A1 | 6/2023 | Yamasaki et al. | |
| 2023/0217098 | A1* | 7/2023 | Wang | ................... G11B 27/031 |
| | | | | 348/333.02 |
| 2025/0080862 | A1* | 3/2025 | Xiao | ...................... H04N 23/84 |
| 2025/0193512 | A1* | 6/2025 | Yamasaki | ............ H04N 23/632 |

FOREIGN PATENT DOCUMENTS

| | | | |
|---|---|---|---|
| JP | 2009-171125 A | 7/2009 | |
| JP | 2021-157941 A | 10/2021 | |
| JP | 7129678 B1 | 9/2022 | |

* cited by examiner

*Primary Examiner* — Paul M Berardesca
(74) *Attorney, Agent, or Firm* — Renner, Otto, Boisselle & Sklar, LLP

(57) ABSTRACT

An imaging apparatus includes: an imaging sensor configured to capture a subject image to generate original image data; an image processor configured to perform image processing to generate image data, the image processing providing the original image data with a predetermined effect; a storage configured to store a plurality of first parameter sets each defining the effect in the image processing, at least one second parameter set defining a correspondence before and after color information in an image is converted, and designation information for designating one of the plurality of first parameter sets combined with each of the at least one second parameter set; and a controller configured to set a specific first parameter set combined with a specific second parameter set to one of the plurality of first parameter sets designated in the designation information when reading the specific second parameter set in the at least one second parameter set from the storage.

10 Claims, 11 Drawing Sheets

IMAGING APPARATUS AND INFORMATION PROCESSING METHOD

CROSS REFERENCE TO RELATED APPLICATION

This application claims priority to Japanese Patent Application 2023-135696 filed on Aug. 23, 2023, the contents of which are incorporated herein by reference.

BACKGROUND

Technical Field

The present disclosure relates to an imaging apparatus and an information processing method.

Background Art

JP 7129678 A discloses an imaging apparatus including an operation unit that receives a user operation of designating a combination of one of a plurality of first parameter sets and one of at least one second parameter set, and an image processor. An image processor of JP 7129678 A adjusts an image indicated by original image data using the first parameter set included in the combination designated by the user operation, and converts color information included in the image adjusted by the first parameter set using the second parameter set included in the designated combination to generate image data.

SUMMARY

The present disclosure provides an imaging apparatus and an information processing method capable of easily obtaining an image subjected to image processing according to user's preference.

An imaging apparatus according to one aspect of the present disclosure includes:

an imaging sensor configured to capture a subject image to generate original image data;

an image processor configured to perform image processing to generate image data, the image processing providing the original image data with a predetermined effect;

a storage configured to store a plurality of first parameter sets each defining the effect in the image processing, at least one second parameter set defining a correspondence before and after color information in an image is converted, and designation information for designating one of the plurality of first parameter sets combined with each of the at least one second parameter set; and a controller configured to set a specific first parameter set combined with a specific second parameter set to one of the plurality of first parameter sets designated in the designation information when reading the specific second parameter set in the at least one second parameter set from the storage.

An information processing method according to one aspect of the present disclosure performed by a processor includes:

acquiring image data generated by giving a predetermined effect by image processing to original image data generated by capturing a subject image, the image data including information indicating a first parameter set defining the effect;

receiving a user operation of converting color information of the image data;

generating a second parameter set defining a correspondence relationship before and after conversion of color information of the image data by the user operation; and generating data including the generated second parameter set and information indicating the first parameter set.

An information processing method according to one aspect of the present disclosure performed by a processor includes generating data including a second parameter set and designation information by acquiring the second parameter set to be applied to original image data in image processing together with the designation information designating a first parameter set defining a predetermined effect given by the image processing to the original image data generated by capturing a subject image.

According to an imaging apparatus and an information processing method according to the present disclosure, it is possible to easily obtain an image subjected to image processing according to user's preference.

BRIEF DESCRIPTION OF DRAWINGS

FIG. 1 is a block diagram illustrating a configuration example of a digital camera according to a first embodiment;

DETAILED DESCRIPTION

Figure 2:
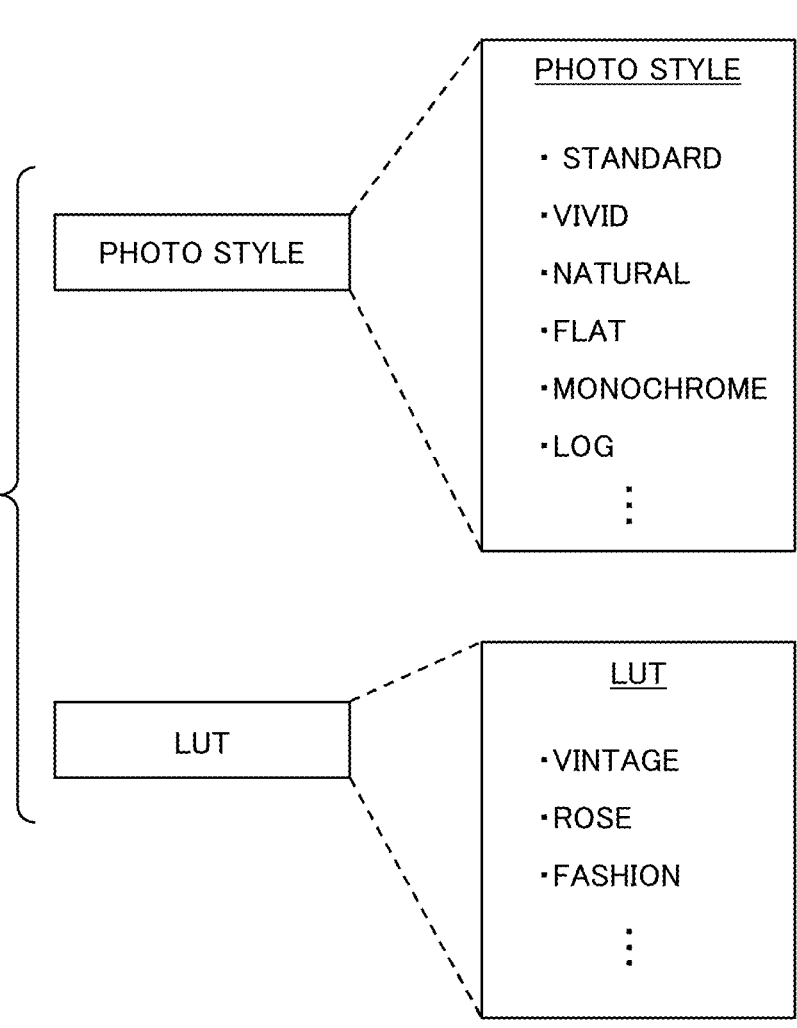
FIG. 2 is a diagram for explaining a photo style and an LUT.

Hereinafter, embodiments will be described with reference to the drawings as appropriate. However, unnecessarily detailed description may be omitted. Note that, the accompanying drawings and the following description are provided for those skilled in the art to fully understand the present disclosure, and are not intended to limit the subject matter described in the claims.

1. First Embodiment 1-1. Configuration 1-1-1. Hardware Configuration

Figure 1:
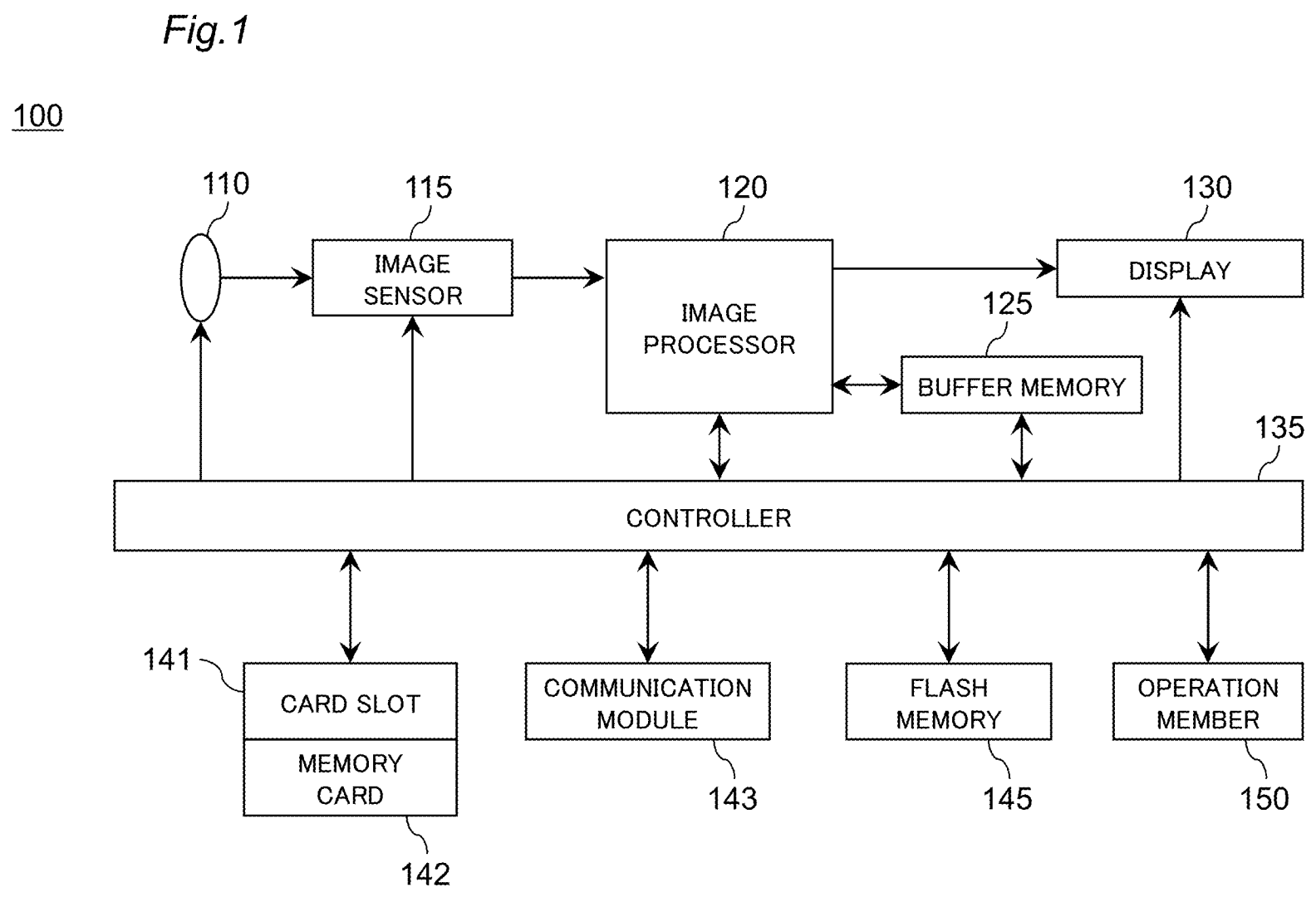

FIG. 1 is a block diagram illustrating a configuration example of a digital camera 100 according to a first embodiment of the present disclosure. The digital camera 100 captures a subject image to generate image data. The image data generated by the digital camera 100 includes moving image data and still image data.

The digital camera 100 captures a subject image formed via an optical system 110 with an image sensor 115 to generate original image data (RAW data). An image processor 120 performs various types of processing on the RAW data generated by the image sensor 115 to generate image data. A controller 135 records the image data generated by the image processor 120 in a flash memory 145 or a memory card 142 inserted into a card slot 141. In addition, the controller 135 can display (reproduce) the image data recorded in the flash memory 145 or the memory card 142 on a display 130 according to the operation of an operation member 150 by a user.

The optical system 110 includes a focus lens, a zoom lens, an optical image stabilization (OIS) lens, a diaphragm, a shutter, and the like. The various lenses included in the optical system 110 may include any number of lenses or any number of groups.

The image sensor 115 captures a subject image formed via the optical system 110 to generate the RAW data. The image sensor 115 generates image data of a new frame at a predetermined frame rate (for example, 30 frames/sec.). The generation timing of the RAW data and the electronic shutter operation in the image sensor 115 are controlled by the controller 135. Note that, various image sensors such as a CMOS image sensor, a CCD image sensor, or an NMOS image sensor may be used for the image sensor 115. The image sensor 115 is an example of an imaging unit in the present embodiment.

The image processor 120 performs various types of processing on the RAW data output from the image sensor 115 to generate image data. In addition, the image processor 120 performs various types of processing on the image data read from the memory card 142 to generate an image to be displayed on the display 130. Examples of the various types of processing include white balance correction, gamma correction, YC conversion processing, electronic zoom processing, compression processing, decompression processing, image processing using a lookup table (LUT), and the like, but are not limited thereto. The image processor 120 may include a hard-wired electronic circuit, a microcomputer using a program or the like.

The display 130 is a display device such as a liquid crystal display, an organic EL display, or the like capable of displaying information. For example, the display 130 displays an image based on the image data processed by the image processor 120. In addition, the display 130 displays a menu screen for the user to confirm the setting of the digital camera 100.

The controller 135 integrally controls operation of the whole digital camera 100. The controller 135 may include a processor configured to realize a predetermined function by executing a program. For example, the controller 135 can be realized by various processors such as a CPU, an MPU, a GPU, a DSU, an FPGA, and an ASIC. The controller 135 may include one or more processors. In addition, the controller 135 may include one semiconductor chip together with the image processor 120 and the like. Although not illustrated, the controller 135 incorporates a ROM. The ROM stores various programs such as autofocus control (AF control) executed by the controller 135. In addition, the controller 135 incorporates a RAM (not illustrated) that functions as a work area of the CPU.

A buffer memory 125 is a recording medium that functions as a work memory of the image processor 120 or the controller 135. The buffer memory 125 is realized by a dynamic random access memory (DRAM) or the like.

The memory card 142 is detachably inserted into the card slot 141. The card slot 141 can be electrically and mechanically connected to the memory card 142. The memory card 142 is an external memory including a recording element such as a flash memory therein. The memory card 142 can store data such as an LUT and image data generated by the image processor 120.

A communication module 143 performs data communication according to an existing wired communication standard or wireless communication standard. For example, the digital camera 100 can communicate with a communication network such as the Internet and/or another device equipped with a Wi-Fi module via the communication module 143. The digital camera 100 may directly communicate with other devices via the communication module 143, or may communicate via an access point.

The flash memory 145 is a nonvolatile recording medium. The flash memory 145 can store various data such as an LUT, photo style setting information 10, LUT setting information 11, and image data, which will be described later.

The operation member 150 is a general term for a user interface such as a hardware key and a software key of the digital camera 100, and receives an operation by the user. The operation member 150 includes, for example, a button, a mode dial, a touch panel, and a switch. When receiving the operation by the user, the operation member 150 transmits an operation signal corresponding to the user operation to the controller 135.

The operation member 150 includes various buttons such as an information display switching (DISPLAY) button, a menu/setting (MENU/SET) button, a return button, a determination button, and cursor buttons. The cursor buttons include pressing buttons respectively corresponding to up, down, left, and right, and when pressed by the user, a selection area displayed on the display 130, a cursor, and the like can be moved. The operation by these various buttons may be configured to be executable not only by physical buttons but also by a touch panel.

1-1-2. Photo Style and LUT

The digital camera 100 has a plurality of photographing modes prepared in advance so that an image can be easily photographed with a color tone and image quality desired by the user. Hereinafter, this photographing mode is referred to as a "photo style". Further, in the digital camera 100 of the present embodiment, to each photo style, for example, an LUT for color grading, which is incorporated from the outside according to the user's preference, can be applied.

1-1-2-1. Phot Style

When a certain photo style is selected in the digital camera 100, various parameters are set such that an image having an effect indicated by the photo style is generated. Specifically, values of parameters such as contrast, highlight, shadow, saturation, color tone, hue, filter effect, granularity, sharpness, noise reduction, and density are set for each photo style so as to obtain the effect indicated by the photo style. As described above, each photo style is configured as an image adjustment parameter set for adjusting the image indicated by RAW data.

As illustrated in FIG. 2, in the digital camera 100, photo styles such as "standard", "vivid", "natural", "flat", "monochrome", and "Log" are prepared. "Standard" is a standard setting, and the "vivid" is a mode in which saturation and contrast are high and a vivid effect can be obtained. The "natural" is a mode in which contrast is low and a soft effect can be obtained. The "monochrome" is a mode in which a monochromatic effect without hue is obtained.

The "Log" is a mode for photographing an image (hereinafter, "Log image") using a logarithmic-curvilinear gamma curve for widely utilizing a dynamic range by an imaging element, and is also referred to as Log gamma. The "flat" is a mode using a flat gamma curve instead of Log gamma, and an effect of suppressing exaggeration can be obtained as compared with other photo styles.

1-1-2-2. LUT

The LUT is stored in an external server in a downloadable manner, for example. The LUT is downloaded from the server by an information processing apparatus and stored in advance in the flash memory 145 of the digital camera 100.

The LUT is an array (parameter set) that defines a correspondence relationship before and after color information for each pixel in an input image is converted. The LUT is, for example, a three-dimensional lookup table indicating a relationship between input/output color data including a combination of three colors of RGB. With reference to the LUT, the image processor 120 performs image processing of converting the color of input image data into the color of output image data.

In the digital camera 100, for example, as illustrated in FIG. 2, names such as "vintage", "rose", and "fashion" can be set to the LUT in accordance with the hue, the theme, the intention of a creator, and the like of the output image data.

In a case where the user attempts to create a unique LUT, it is easier to understand the effect of color correction by attempting color correction from the hue close to a color felt by a person when a subject is viewed with naked eyes, such as a standard, rather than attempting color correction from the hue of a Log image having low saturation and contrast. Therefore, since the unique LUT is available in the digital camera 100, the user can easily create and use the LUT that matches his/her preference.

1-1-2-3. Selection of Photo Style to which LUT is Applied

An LUT currently distributed is generally created assuming that the LUT is applied to a Log image. The user can acquire an LUT for a Log image for free on the Internet, for example, or purchase the LUT from a seller such as an expert in image processing, and incorporate the LUT into the digital camera 100.

The digital camera 100 of the present embodiment provides an option for the user to combine an LUT with a desired photo style as illustrated in FIG. 2 so as not to be bound by the fixed idea that the LUT applicable to image data must be for a Log image.

For example, the user can create an LUT assuming a desired photo style among the "standard", the "vivid", the "natural", the "flat", the "monochrome", and the like, and store the LUT in the flash memory 145 via the memory card 142 or the like. As a result, for example, the LUT not for a Log image but for a standard image can be applied to the image having the effect indicated by the photo style "standard".

In order to apply an intended LUT to an image having intended image quality, it is necessary that an image which is the base to which the LUT is applied is set to an image having image quality intended by the user when the LUT is applied. For example, in a case where the user desires to apply an LUT for the standard image to an image having the effect indicated by the photo style "standard", when the LUT is applied, it is necessary that "standard" is selected in advance as a photo style (hereinafter, referred to as a "base photo style") which is the base of the LUT application.

As a means for selecting a base photo style before applying an LUT, it is conceivable that the user manually selects an appropriate base photo style corresponding to the LUT to be applied. However, in order to realize such a means, it is necessary for the user to memorize a base photo style for each LUT and perform a setting operation of the base photo style before applying an LUT. When the user does not memorize the base photo style or neglects to set the base photo style, an image intended by the user may not be obtained.

The digital camera 100 of the present embodiment automatically selects a base photo style in accordance with the LUT selected by the user operation, and applies the selected LUT and the base photo style to image data. As a result, even when the user does not memorize the base photo style or neglects to set the base photo style, the digital camera 100 can easily obtain an image intended by the user.

Figure 3:
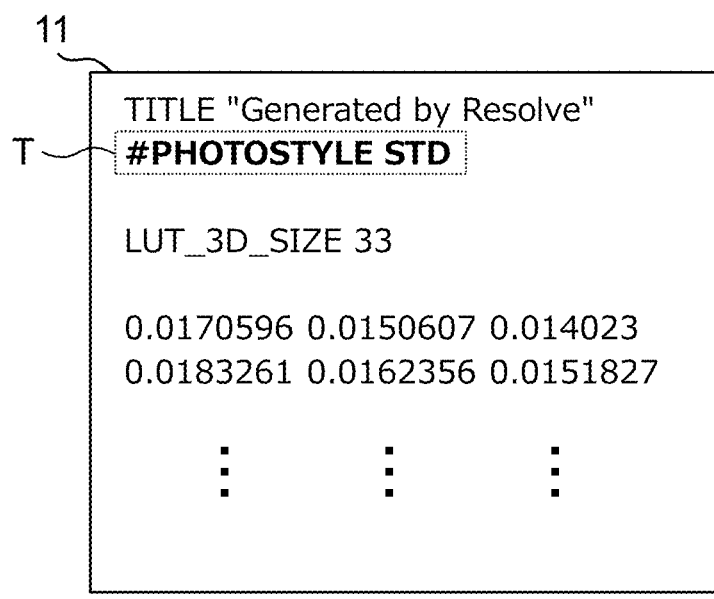
FIG. 3 is a diagram illustrating an example of LUT setting information.

In order to enable such a selection of a base photo style, in the present embodiment, the LUT setting information 11 which is an LUT file such as a cube file describing an LUT includes designation information for designating a base photo style. FIG. 3 is a diagram illustrating an example of the LUT setting information 11. In the LUT setting information 11 in FIG. 3, a tag T is described as an example of the designation information for designating a base photo style. Details of the tag T will be described later.

1-1-2-4. Data Structure

Figure 4:
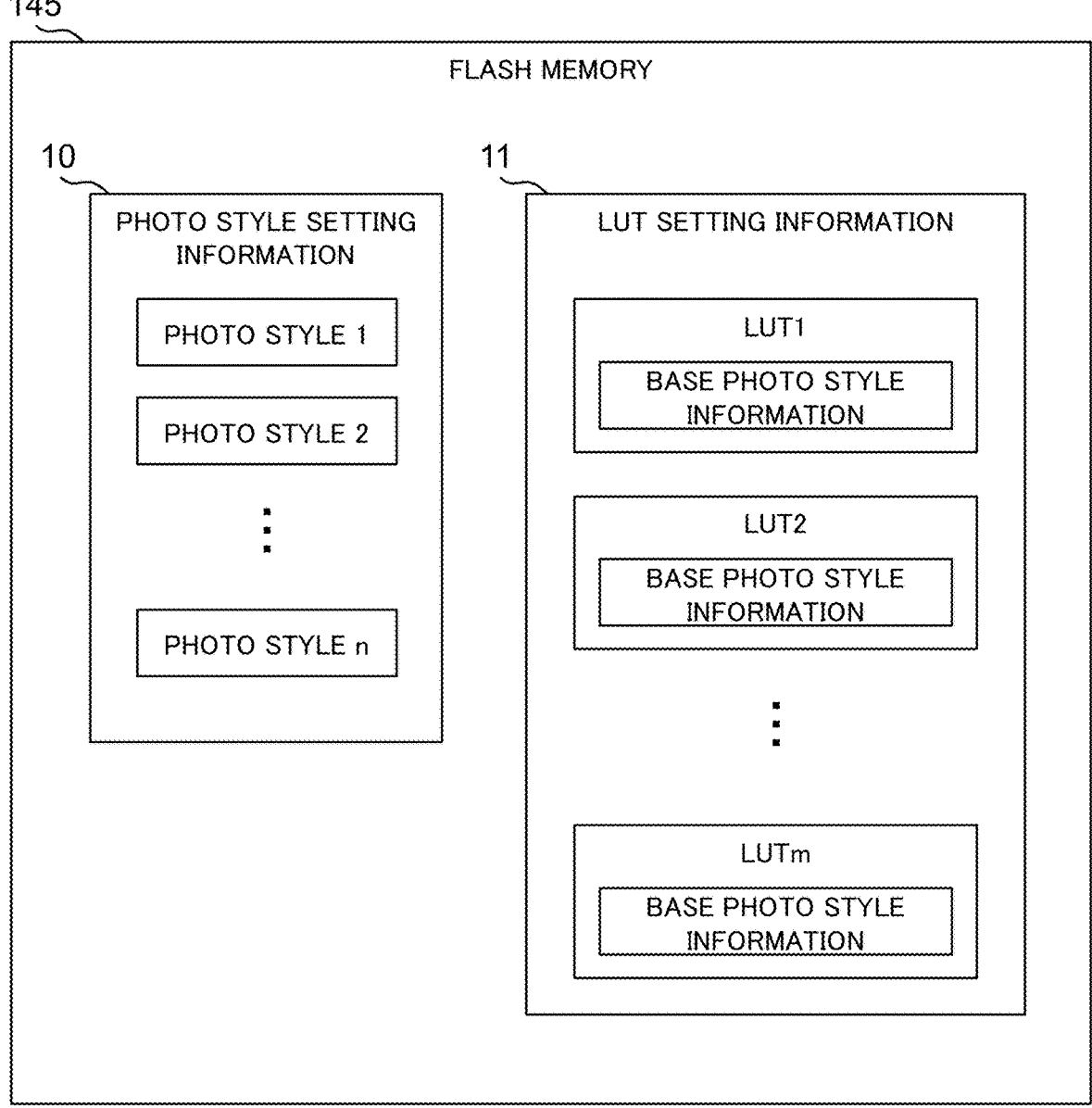
FIG. 4 is a diagram illustrating an example of a data structure stored in a flash memory of the digital camera according to the first embodiment.

FIG. 4 is a diagram illustrating an example of a data structure stored in the flash memory 145 of the digital camera 100 according to the present embodiment. In the flash memory 145, setting information related to photo styles and LUTs is managed as the photo style setting information 10 and the LUT setting information 11, respectively.

In FIG. 4, the photo style setting information 10 includes setting information related to one or more (n) photo styles. The LUT setting information 11 includes setting information related to one or more (m) LUTs.

As illustrated in FIG. 4, setting information related to each LUT in the LUT setting information 11 includes base photo style information which is an example of the designation information for designating a base photo style. The base photo style information is described as the tag T illustrated in FIG. 3 in a text file describing the LUT setting information 11.

"# PHOTOSTYLE STD" illustrated as the tag T in FIG. 3 corresponds to the photo style "standard". In a case where "# PHOTOSTYLE STD" is described as the tag T in the text file describing the LUT setting information 11 as illustrated in FIG. 3, the base photo style information designates the "standard" as a base photo style.

As other tags T, for example, "# PHOTOSTYLE VIVD" corresponds to the photo style "vivid", "# PHOTOSTYLE NAT" corresponds to the photo style "natural", "# PHOTOSTYLE FLAT" corresponds to the photo style "flat", and "# PHOTOSTYLE MONO" corresponds to the photo style "monochrome".

1-2. Operation 1-2-1. Setting Operation of LUT and Base Photo Style

Figure 5:
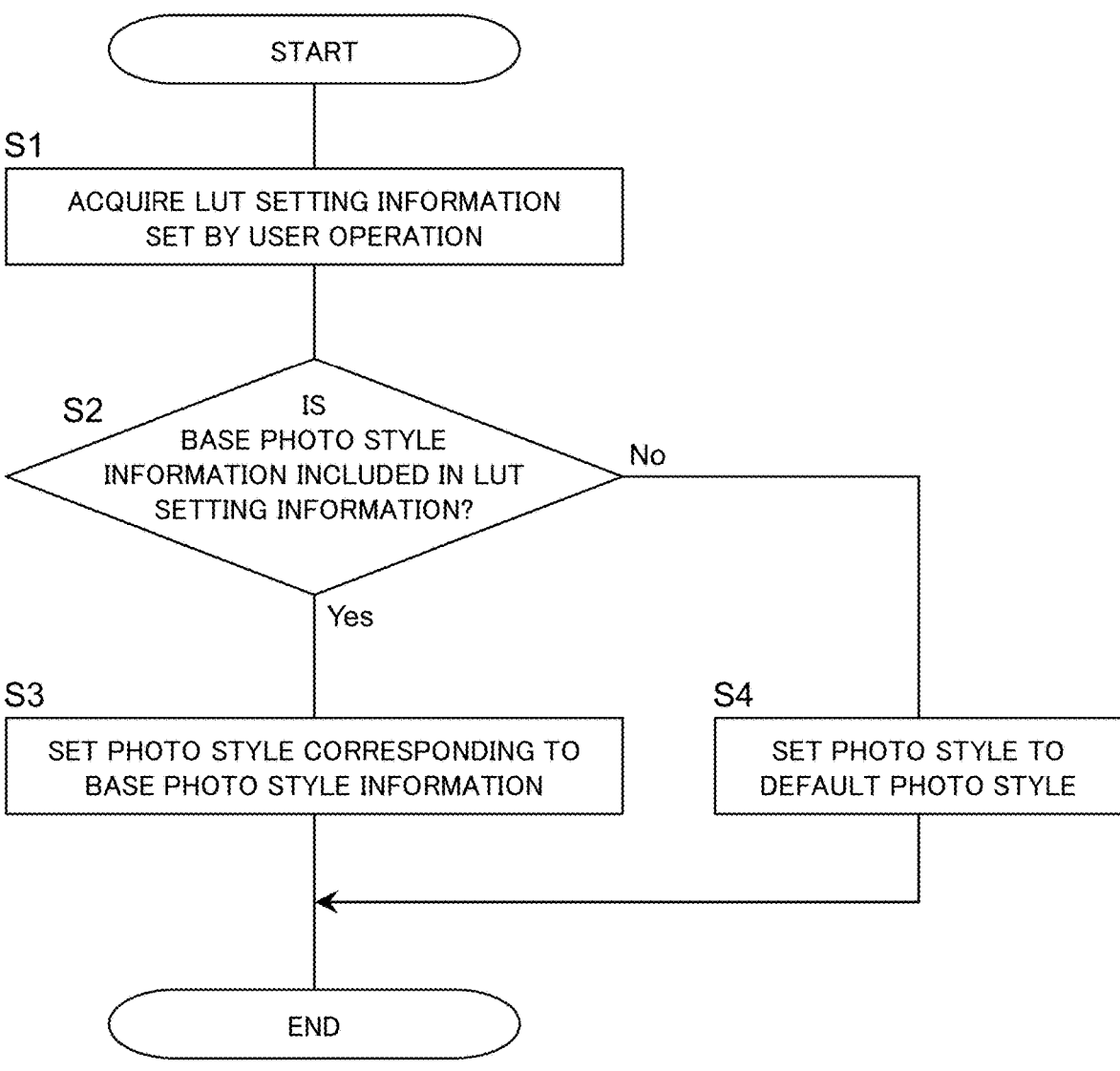
FIG. 5 is a flowchart for explaining an example of a method for setting a base photo style in the digital camera according to the first embodiment.
Figure 6:
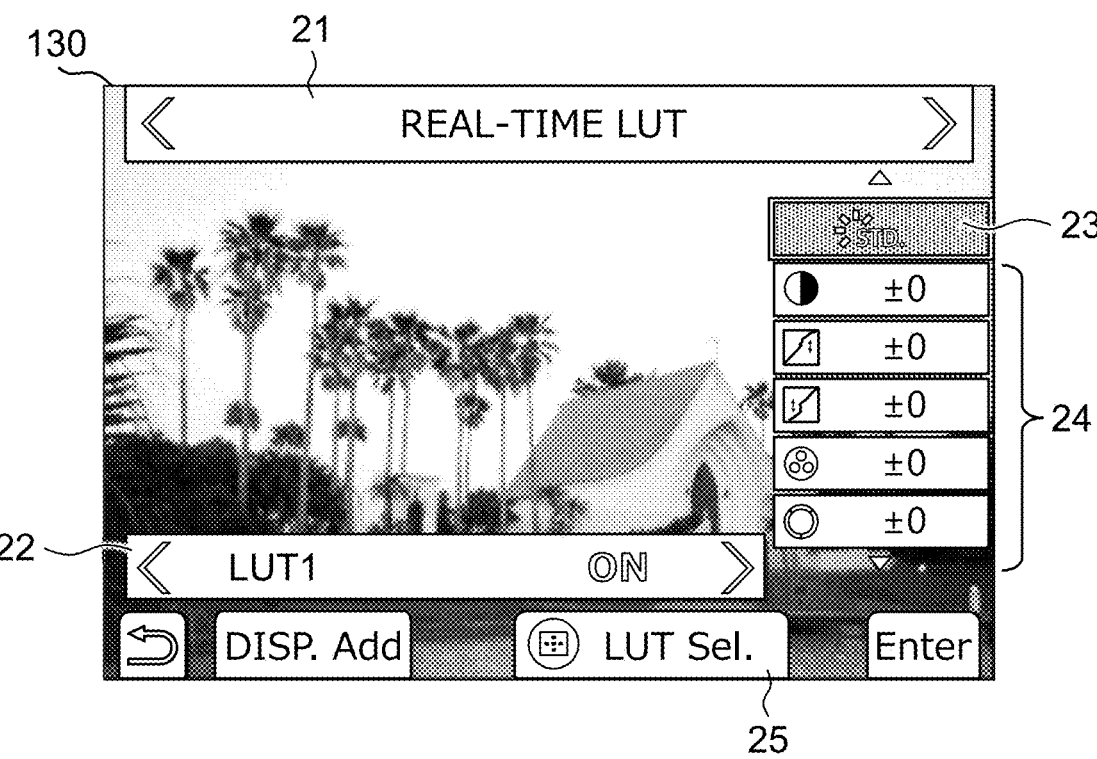
FIG. 6 is a schematic diagram illustrating an example of a setting screen of the photo style and the LUT displayed on the display of the digital camera according to the first embodiment.
Figure 7:
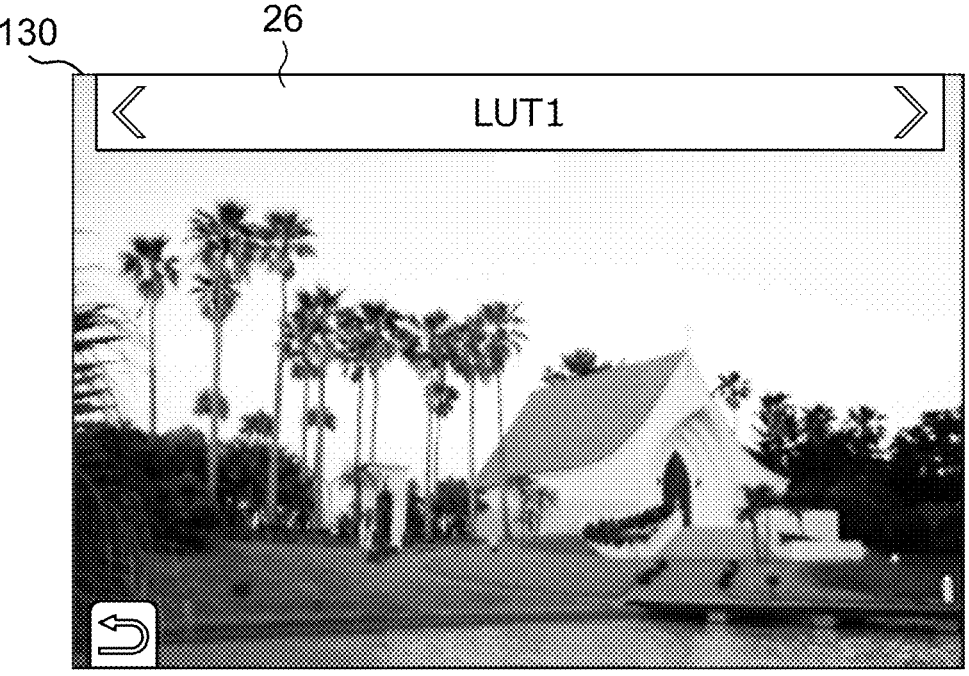
FIG. 7 is a schematic diagram illustrating an example of an LUT selection screen displayed on the display of the digital camera according to the first embodiment.

In the digital camera 100, setting and selection of an LUT described above can be easily performed by the user using the display 130 and the operation member 150. In the digital camera 100, the controller 135 automatically selects a base photo style which is a base of the selected LUT. With reference to FIGS. 5 to 7, an example of a method for setting an LUT and a base photo style in the digital camera 100 will be described.

FIG. 5 is a flowchart for explaining an example of a method for setting a base photo style in the digital camera 100 according to the present embodiment. Each processing illustrated in the flowchart in FIG. 5 is performed by the controller 135.

The user can set the LUT setting information 11 by selecting a desired LUT using the operation member 150. The controller 135 acquires the LUT setting information 11 set by the user operation (S1).

The controller 135 determines whether or not base photo style information is included in the acquired LUT setting information 11 (S2).

In a case where the base photo style information is included in the LUT setting information 11 (Yes in S2), the controller 135 sets the photo style to a photo style corresponding to the base photo style information (S3). For example, in a case where "# PHOTOSTYLE STD" is included as the tag T in the LUT setting information 11 as illustrated in FIG. 3, the controller 135 sets a photo style to "standard".

In a case where the base photo style information is not included in the LUT setting information 11 (No in S2), the controller 135 sets a photo style to a default photo style (S4). The default photo style may be, for example, "Log", but is not limited thereto, and may be set to any photo style.

FIGS. 6 and 7 are schematic diagrams illustrating an example of a display screen displayed on the display 130 of the digital camera 100 when the LUT setting information 11 is set in step S1 of FIG. 5.

FIG. 6 illustrates a setting screen of a photo style and an LUT. On the setting screen in FIG. 6, a photo style selection menu 21 for selecting a photo style, an LUT switching menu 22, a photo style display 23, a parameter display 24, an LUT selection button 25, and the like are displayed.

In the photo style selection menu 21, a text or a diagram corresponding to a photo style which is a selection candidate is displayed. For example, in the photo style selection menu 21, a text indicating a photo style which is a selection candidate such as "standard" or "vivid", is displayed. The user can change a photo style which is a selection candidate by pressing a cursor button in the left-right direction, and determines the photo style to be applied by pressing a determination button.

In the example of FIG. 6, "real-time LUT" is displayed in the photo style selection menu 21. The "real-time LUT" is a mode (LUT application mode) in which an LUT can be applied to a photo style. In the LUT application mode, as illustrated in FIG. 6, the LUT switching menu 22 for switching ON and OFF of LUT application is displayed. The LUT switching menu 22 displays an LUT file name ("LUT1" in FIG. 6) for specifying an LUT and a state display indicating whether the LUT is currently ON or OFF. The user can switch between ON and OFF of the LUT by pressing a cursor button in the left-right direction, for example.

On the photo style display 23, a text or a diagram indicating a photo style ("standard" in FIG. 6) applied to a captured image is displayed. In the present embodiment, in a case where an LUT is applied ("ON" in the LUT switching menu 22), a base photo style is automatically selected by the controller 135.

In this case, since the base photo style is automatically selected, in the digital camera 100, the change of photo style by the user may be prohibited. In this case, the controller 135 may cause the photo style display 23 to be grayed out to indicate that the user cannot change a photo style. In FIG. 6, the photo style display 23 is grayed out.

The parameter display 24 includes values of various parameters of the photo style described above, for example. For example, the user can input an operation of changing a value of a parameter such as contrast, highlight, shadow, saturation, granularity, sharpness, noise reduction, or density by selecting a desired adjustable parameter and pressing a cursor button in the left-right direction. In addition to the case where the base photo style is a photo style such as "standard", "vivid", "natural", "flat", or "monochrome", even in the case of "Log", the user can adjust a value of each parameter. Since the changed parameter is reflected on an image displayed on the display screen in real time, the user can change the parameter while checking the effect. In response to such a user operation, the controller 135 acquires parameter change information indicating the parameter changed by the user operation.

When the user presses the LUT selection button 25, the controller 135 causes the display screen to transition to the LUT selection screen illustrated in FIG. 7.

An LUT selection menu 26 is displayed on the LUT selection screen in FIG. 7. The user can select an LUT by pressing a cursor button in the left-right direction, for example.

1-2-2. Photographing Operation

Figure 8:
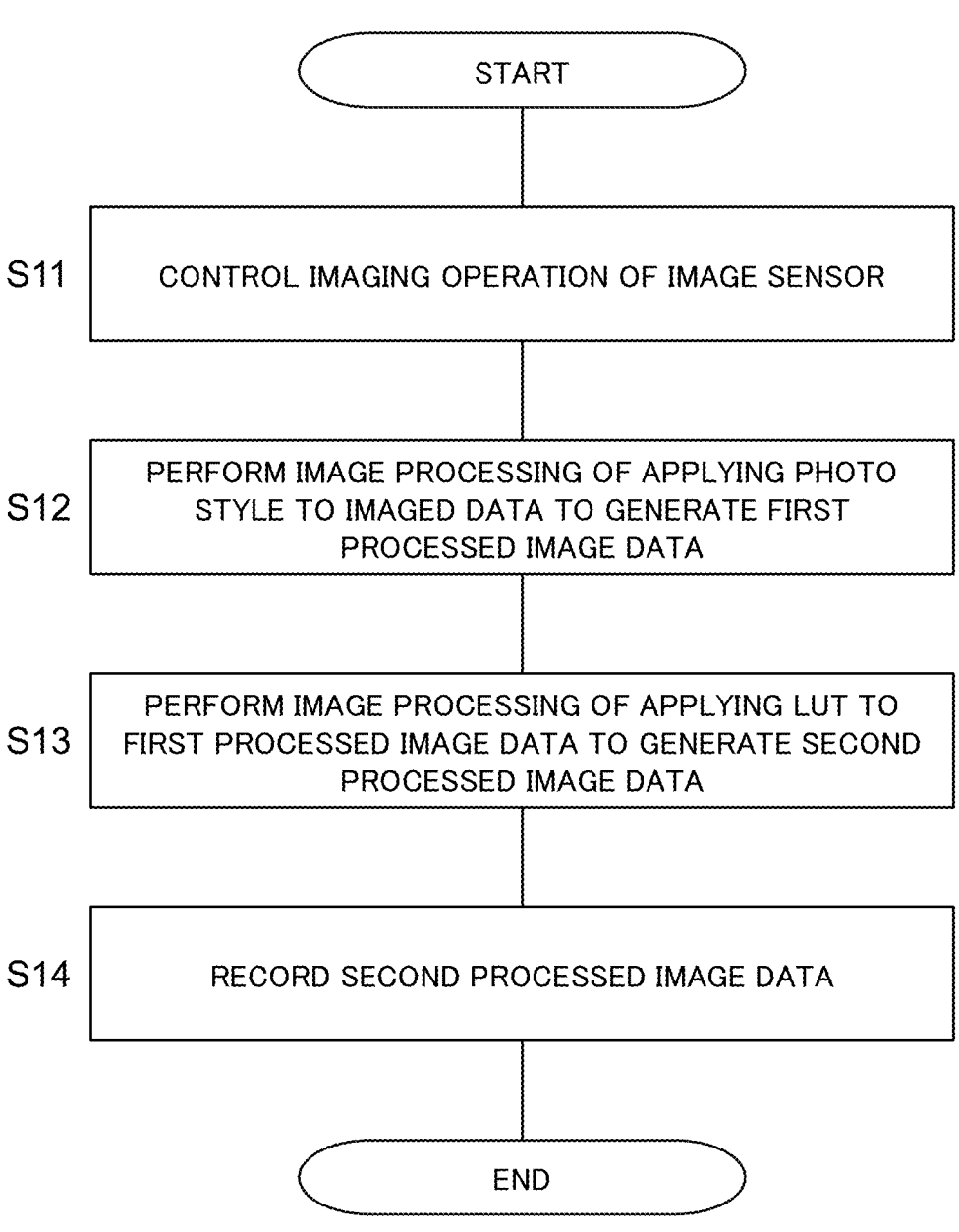
FIG. 8 is a flowchart for explaining an example of a photographing operation in the digital camera according to the first embodiment.

An example of an operation of photographing an image by applying the LUT and the photo style set as described above in the digital camera 100 of the present embodiment will be described with reference to FIG. 8. FIG. 8 is a flowchart for explaining an example of a photographing operation in the digital camera 100.

In FIG. 8, first, the controller 135 controls the image sensor 115 on the basis of the user operation received by the operation member 150, for example, a shutter button (S11). Under the control of the controller 135, the image sensor 115 captures a subject image formed via the optical system 110 to generate RAW data, and outputs the RAW data to the image processor 120.

Next, the image processor 120 performs image processing of adjusting the image indicated by the RAW data by using the photo style selected in step S3 or step S4 of FIG. 5 to generate image data (hereinafter, referred to as "first processed image data") to which the photo style is applied as intermediate data (S12).

Next, the image processor 120 applies the LUT selected in step S1 of FIG. 5 to the first processed image data to generate image data (hereinafter, referred to as "second processed image data") to which the LUT is applied (S13). For example, with reference to the selected LUT, the image processor 120 converts the color of the first processed image data serving as an input into the color of the output image for each pixel, to generate the second processed image data.

Next, the controller 135 records the second processed image data generated in step S13 in the memory card 142 as output image data via the card slot 141 (S14).

As described above, the digital camera 100 according to the present embodiment can output the image data to which the photo style and the LUT are applied, and can output the LUT-applied image data as described above in real time.

Unlike RAW data, the LUT-applied image data output by the digital camera 100 can be easily viewed and used by a general-purpose device such as a PC or a smartphone. As described above, according to the digital camera 100, since an external device such as a PC is not required for LUT application, the workflow for generating the LUT-applied image data can be made efficient.

In addition, since the selected LUT and the base photo style automatically selected according to the LUT are applied to the RAW data obtained by the photographing operation, the digital camera 100 can prevent the LUT from being applied to a photo style not intended by the user.

1-3. Effects and the Like

As described above, the digital camera 100, which is an example of an imaging apparatus according to the present embodiment, includes the image sensor 115, which is an example of an imaging unit, the image processor 120, the flash memory 145, which is an example of a storage, and the controller 135, which is an example of a controller. The image sensor 115 captures a subject image to generate RAW data which is an example of an original image data. The image processor 120 performs image processing to generate image data. The image processing provides the original image data with a predetermined effect. The flash memory 145 stores a plurality of photo styles (an example of a first parameter set) and at least one LUT (an example of a second parameter set). The flash memory 145 further stores base photo style information which is an example of designation information for designating a photo style combined with each of the at least one LUT. Each photo style defines the predetermined effect in the image processing. Each LUT defines a correspondence before and after color information in an image is converted. When reading a specific LUT among the at least one LUT from the flash memory 145, the controller 135 sets a specific photo style combined with the specific LUT to one of the plurality of photo styles designated in the base photo style information.

By setting an appropriate base photo style when reading of the LUT, the digital camera 100 can easily obtain an image subjected to image processing according to the user's preference. For example, even when the user does not memorize the base photo style or neglects to set the base photo style, the digital camera 100 can easily obtain an image intended by the user.

The flash memory 145 may store data including the specific LUT and the base photo style information. In this case, when reading a specific LUT, the controller 135 reads the base photo style information and sets a specific photo style combined with the specific LUT to one of the plurality of photo styles designated in the base photo style information. By reading the base photo style information when reading the LUT, the digital camera 100 can set an appropriate base photo style when reading the LUT.

The image processor 120 may adjust the image indicated by RAW data using the specific photo style, and convert color information included in the image adjusted with the specific photo style using the specific LUT to generate image data. With this configuration, it is possible to easily obtain image data indicating an image intended by the user.

The digital camera 100 may further include the operation member 150 that receives a user operation and the display 130 which is an example of a display unit that displays information. When the specific photo style is set, the controller 135 may cause the display 130 to display information indicating that the user cannot change the specific photo style to another photo style using the operation member 150. With this configuration, it is possible to notify the user that a photo style cannot be changed.

When the specific photo style is set, the controller 135 may cause the display 130 to display information indicating at least one parameter that is included in the specific photo style and is adjustable by a user operation. With this configuration, the user can easily input an operation of changing a parameter value of a photo style.

2. Second Embodiment

The base photo style information illustrated as the tag T in FIG. 3 is embedded in the LUT setting information 11, for example, when an LUT creator creates the LUT setting information 11 using an information processing apparatus (terminal). Such embedding may be performed manually by the creator, but the base photo style information may be automatically embedded in the LUT setting information 11. An example of an information processing apparatus and an information processing method for automatically embedding the base photo style information in the LUT setting information 11 will be described below.

2-1. Configuration

Figure 9:
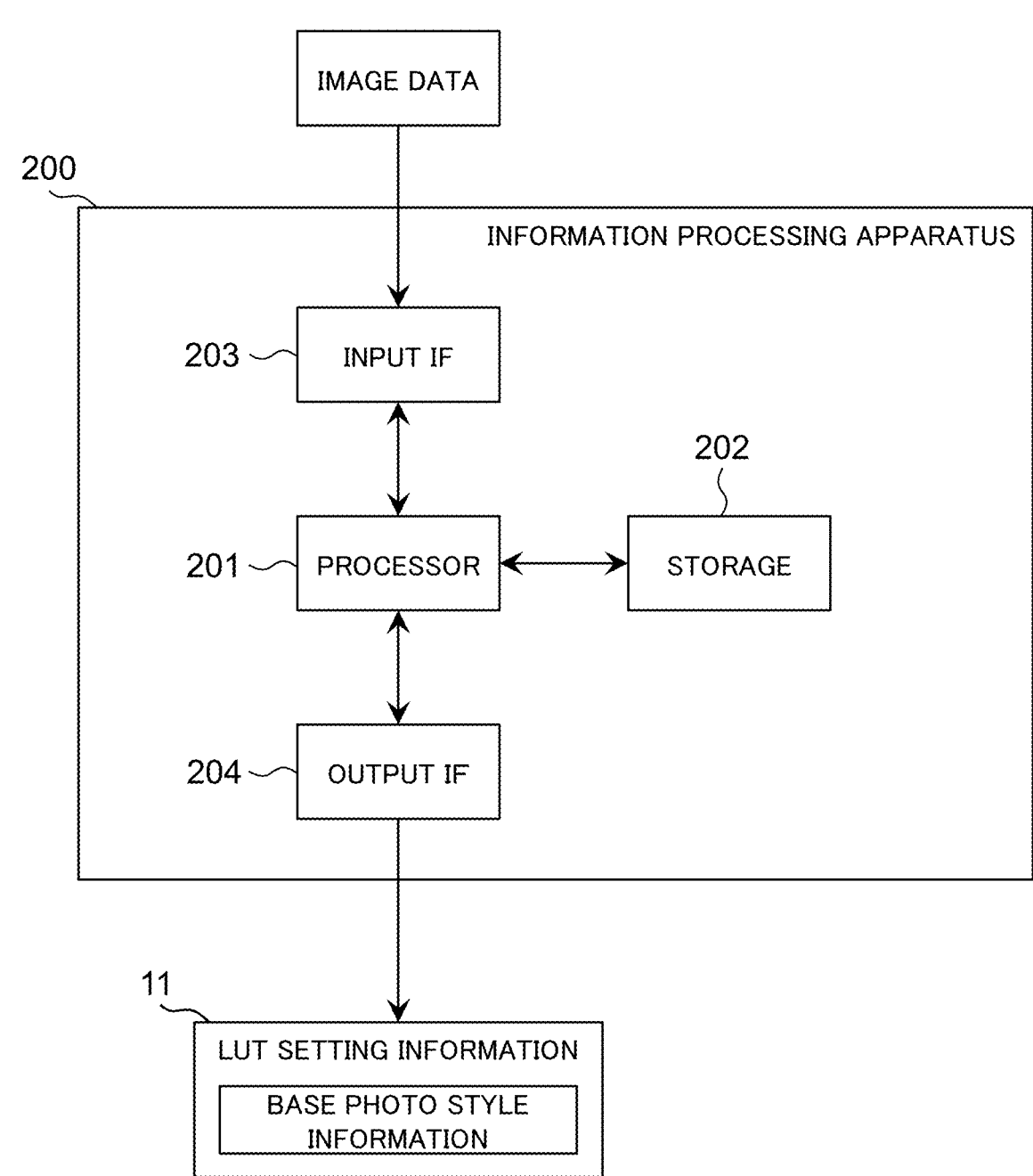
FIG. 9 is a block diagram illustrating a configuration example of an information processing apparatus according to a second embodiment.

FIG. 9 is a block diagram illustrating a configuration example of an information processing apparatus 200 according to a second embodiment. The information processing apparatus 200 is, for example, an electronic device such as a personal computer, a smartphone, or a tablet terminal. The information processing apparatus 200 may be the digital camera 100 or a smartphone with a camera function.

The information processing apparatus 200 includes a processor 201, a storage 202, an input interface (IF) 203, and an output interface 204.

The processor 201 performs information processing to realize the functions of the information processing apparatus 200. Such information processing is realized, for example, by the processor 201 operating according to a program stored in the storage 202. The processor 201 includes an operation circuit that performs an operation for information processing. For example, the processor 201 includes a circuit such as a CPU, an MPU, or an FPGA.

The storage 202 is a recording medium that records various pieces of information including a program necessary for realizing the functions of the information processing apparatus 200. The storage 202 is realized by, for example, a semiconductor storage such as a flash memory or a solid state drive (SSD), a magnetic storage such as a hard disk drive (HDD), or another recording media alone or in combination thereof. The storage 202 may include a volatile memory such as an SRAM or a DRAM.

Although the example in which the program is stored in the storage 202 has been described above, the storage location of the program is not limited to the storage 202. For example, the program may be recorded in a non-transitory computer-readable recording medium. In addition, the program may be stored in a storage in one or more external information processing apparatuses accessible from the information processing apparatus 200 via a network. In this case, the information processing apparatus 200 can also realize the functions of the information processing apparatus 200 by cloud computing.

The input interface 203 is an interface circuit that connects the information processing apparatus 200 and an external device in order to input information such as image data to the information processing apparatus 200. The input interface 203 may be a communication circuit that performs data communication according to an existing wired communication standard or wireless communication standard.

The output interface 204 is an interface circuit that connects the information processing apparatus 200 and an output device in order to output information from the information processing apparatus 200. The output interface 204 may be a communication circuit that performs data communication according to an existing wired communication standard or wireless communication standard. The input interface 203 and the output interface 204 may be realized by similar hardware.

2-2. Operation

Figure 10:
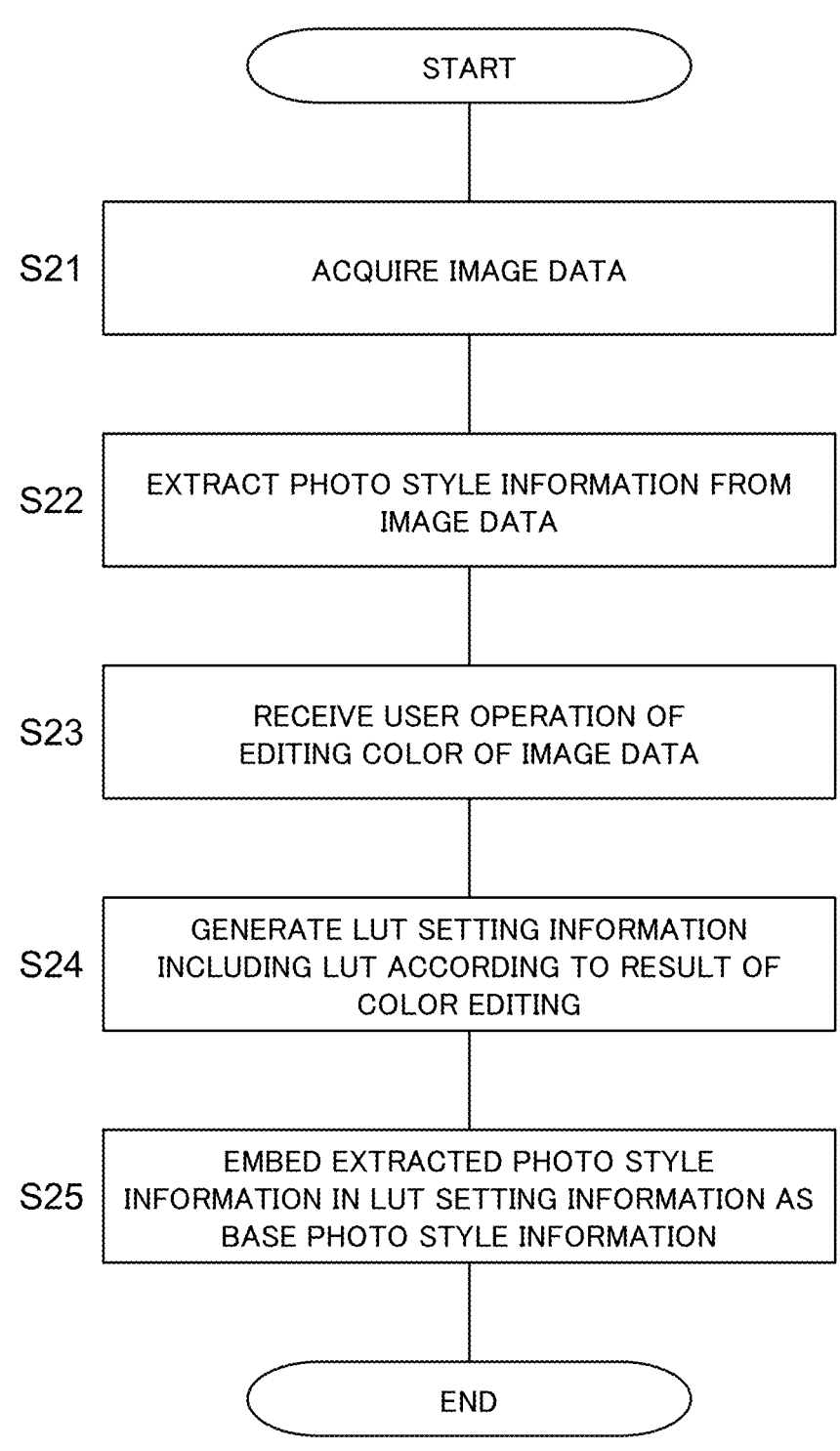
FIG. 10 is a flowchart for explaining an example of a method for generating LUT setting information including base photo style information according to the second embodiment.

FIG. 10 is a flowchart for explaining an example of a method for generating the LUT setting information 11 including base photo style information in the information processing apparatus 200 according to the present embodiment. Each processing illustrated in the flowchart in FIG. 10 is performed by the processor 201.

In FIG. 10, first, the processor 201 acquires image data (S21). The image data is, for example, captured image data of the digital camera 100, and the processor 201 acquires the image data from the digital camera 100 or an external storage via a network and the input interface 203. Alternatively, the information processing apparatus 200 may have a card slot as the input interface 203, and the processor 201 may acquire image data from the memory card 142 inserted into the card slot.

The processor 201 extracts photo style information from the acquired image data (S22). The photo style information is included in image data as metadata such as exif information, for example. For example, the digital camera 100 can embed information indicating a photo style applied at the time of photographing in image data as metadata.

The processor 201 receives a user operation of editing the color of the image data acquired in step S21 (S23). Such a user operation is input to the input interface 203 by an input device such as a keyboard, a mouse, or a touch pad, for example, and then input to the processor 201.

The processor 201 generates the LUT setting information 11 including the LUT according to the result of the color editing in step S23 (S24). As described above, the user can generate and edit an LUT using the information processing apparatus 200.

The processor 201 embeds the photo style information extracted in step S22 in the LUT setting information 11 generated in step S24 as base photo style information (S25). For example, the processor 201 describes the base photo style information as the tag T illustrated in FIG. 3 in the text file describing the LUT setting information 11. As a result, the LUT setting information 11 as illustrated in FIG. 3 can be obtained.

The LUT setting information 11 including the base photo style information thus obtained may be stored in the storage 202, or may be stored in a storage in one or more information processing apparatuses such as an external server. The LUT setting information 11 may be transmitted to the imaging apparatus via a network. For example, the controller 135 of the digital camera 100, which is an example of an imaging apparatus, acquires the LUT setting information 11 via the communication module 143, and stores the acquired LUT setting information 11 in the flash memory 145. As a result, with reference to the LUT setting information 11, the controller 135 can apply the base photo style automatically selected according to the LUT to RAW data.

In addition, as described above, the information processing apparatus 200 may be a smartphone with a camera function. In this case, after capturing an image to generate RAW data, the information processing apparatus 200 can apply the base photo style automatically selected according to the LUT to the RAW data with reference to the LUT setting information 11 stored in the storage 202.

2-3. Effects and the Like

As described above, the method for generating the LUT setting information 11, which is an example of the information processing method according to the present embodiment, is performed by a processor (for example, the processor 201). The generating method includes a step (S21) of acquiring image data, and a step (S23) of receiving a user operation of converting color information of the image data. The image data is generated by giving a predetermined effect to the RAW data generated by capturing a subject image by image processing. The image data includes base photo style information as an example of information indicating a photo style defining the effect. The generating method further includes a step (S24) of generating an LUT defining a correspondence relationship before and after conversion of color information of the image data by a user operation, and a step (S25) of generating data including the generated LUT and the base photo style information.

With this configuration, the generating method can generate data including the generated LUT and the corresponding base photo style information.

3. Third Embodiment

The LUT setting information 11 including the base photo style information obtained in step S25 of the second embodiment may be posted on a website that discloses various pieces of the LUT setting information 11. By seeing the LUT setting information 11 posted on such a website, the user can download desired LUT setting information 11 for a fee or free.

For example, in such a web site, the LUT setting information 11 is posted so that the user can understand what the corresponding base photo style is. For example, the LUT corresponding to the photo style "standard" is arranged in the column of "standard" on the website, and the LUT corresponding to the photo style "vivid" is arranged in the column of the "vivid". However, the present embodiment is not limited thereto, and the base photo style corresponding to the LUT setting information 11 may not be clearly described in the website.

Figure 11:
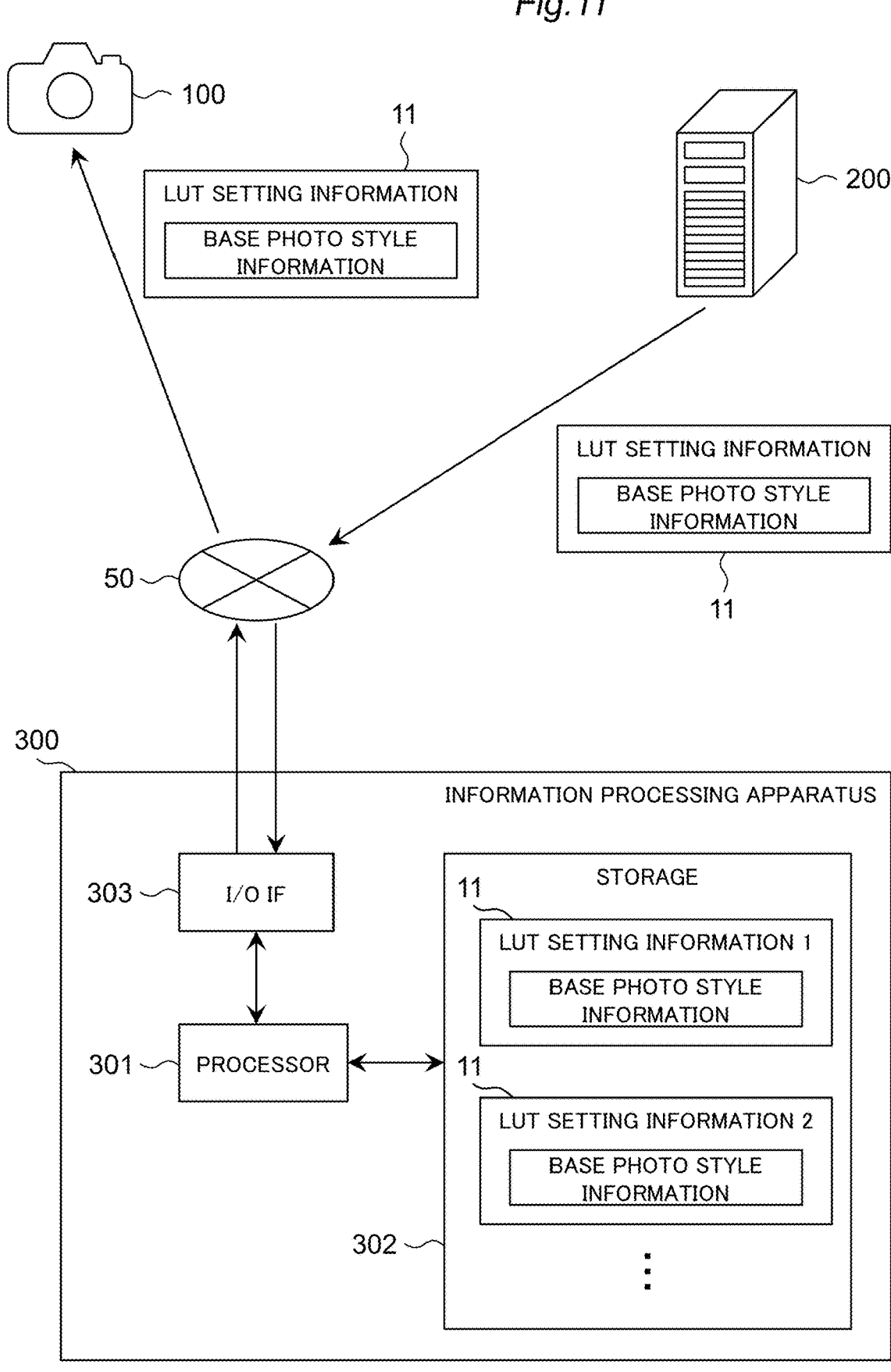
FIG. 11 is a block diagram illustrating a configuration example of an information processing apparatus according to a third embodiment.

FIG. 11 is a block diagram illustrating a configuration example of an information processing apparatus 300 according to a third embodiment that manages the web site as described above. The information processing apparatus 300 includes a processor 301, a storage 302, and an input/output interface 303. The processor 301 and the storage 302 have configurations similar to those of the processor 201 and the storage 202 in FIG. 9, respectively. For example, the storage 302 is a recording medium that records various pieces of information including a program necessary for realizing the functions of the information processing apparatus 300.

The input/output interface 303 is an interface circuit that connects the information processing apparatus 300 and an external device in order to input/output information such as the LUT setting information 11. The input/output interface 303 may be a communication circuit that performs data communication according to an existing wired communication standard or wireless communication standard.

Figure 12:
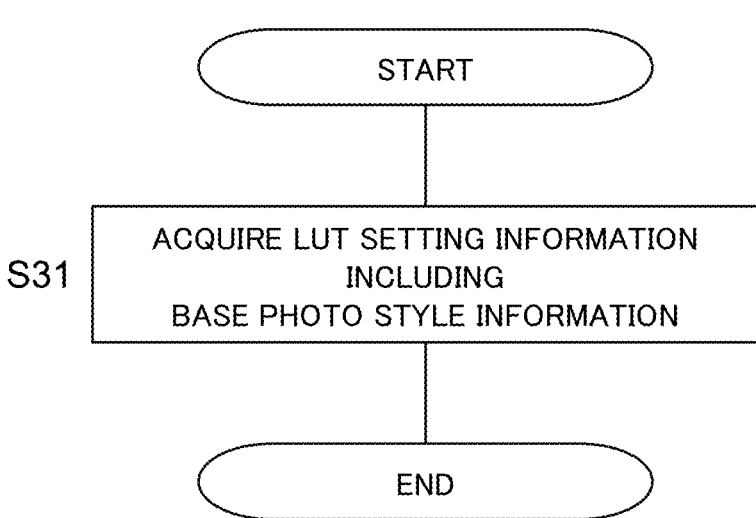
FIG. 12 is a flowchart illustrating an information processing method according to the third embodiment.

FIG. 12 is a flowchart illustrating an information processing method performed by the processor 301 of the information processing apparatus 300 in FIG. 11. The processor 301 acquires the LUT setting information 11 including the base photo style information (an example of designation information) from an external device such as the information processing apparatus 200 via a network 50 via the input/output interface 303 (S31). The processor 301 can generate the LUT setting information 11 including the base photo style information by acquiring the LUT setting information 11.

As illustrated in FIG. 11, the processor 301 stores the acquired LUT setting information 11 in the storage 302. As a result, the user can check and download various pieces of the LUT setting information 11 on the web site that discloses the LUT setting information 11 by the information processing apparatus 300.

The LUT setting information 11 in the information processing apparatus 300 is downloaded by the digital camera 100 as illustrated in FIG. 11, for example. Alternatively, the LUT setting information 11 may be stored in the memory card 142 after being downloaded by another information processing apparatus. The digital camera 100 acquires the LUT setting information 11 from the memory card 142 via the card slot.

As described above, the information processing method according to the present embodiment includes step S31 of generating the LUT setting information 11 including the LUT and the base photo style information by acquiring the LUT and the base photo style information which is an example of the designation information for designating a photo style. The photo style is an example of the first parameter set that defines a predetermined effect given by image processing to the RAW data which is an example of the original image data generated by capturing a subject image. The LUT is an example of the second parameter set to be applied to the RAW data together with the photo style in the image processing. With this configuration, the user can acquire the desired LUT setting information 11 from the information processing apparatus 300 and use it in the digital camera 100.

4. Other Embodiments

As described above, the embodiments have been described as examples of the technology in the present disclosure. However, the technology in the present disclosure is not limited thereto, and can also be applied to embodiments in which changes, substitutions, additions, omissions, and the like are appropriately made. In addition, it is also possible to combine the components described in the above embodiments to form a new embodiment. Therefore, modifications as other embodiments will be described below.

4-1. First Modification

In the first embodiment, an example has been described in which the controller 135 of the digital camera 100 performs an operation (S2 to S4) according to whether or not the base photo style information is included in the LUT setting information 11 acquired in step S1 of FIG. 5. That is, in the first embodiment, whether or not the base photo style information is included in the LUT setting information 11 has been determined before step S1. For example, the base photo style information is embedded in the LUT setting information 11 by a processor of an information processing apparatus used for production at the time of the LUT production.

However, the timing at which the base photo style information is embedded in the LUT setting information 11 is not limited thereto. For example, the controller 135 of the digital camera 100 may embed the base photo style information in the LUT setting information 11 based on a user operation. Alternatively, the controller 135 may correct the base photo style information already included in the LUT setting information 11 based on a user operation.

4-2. Second Modification

In the first embodiment, an imaging operation example has been described in which a photo style and an LUT are applied (S12, S13) to the RAW data (S11 of FIG. 8) obtained by capturing a subject image, and image data after the application is recorded (S14). However, the method for generating image data in the present disclosure is not limited thereto.

For example, the controller 135 of the digital camera 100 can record the RAW data obtained by capturing a subject image in the flash memory 145. The digital camera 100 can apply a photo style and an LUT to the existing RAW data obtained as described above, and record the image data after the application in the memory card 142. As described above, with the digital camera 100, the user can attempt to apply various photo styles and LUTs to RAW data after photographing, and can obtain the image data more suitable for the user's preference.

4-3. Third Modification

In the first embodiment, the example in which the image data generated in step S13 of FIG. 8 is recorded in the memory card 142 has been described, but the recording destination of the image data is not limited thereto. For example, the controller 135 may transmit the image data generated in step S13 to an external device such as a server device via the communication module 143 which is an example of a communication unit. Since the image data may be moving image data, the user can perform live moving image distribution, WEB conference, and the like by using a unique video to which a photo style and an LUT are applied, for example.

In addition, for example, the digital camera 100 may include a USB interface, and the image data may be recorded in a recording medium such as an SSD, an HDD, or a flash memory connected to the digital camera 100 via the USB interface.

4-4. Fourth Modification

In the first embodiment, as an example of an LUT, the three-dimensional lookup table indicating a relationship between input/output color data including a combination of three colors of RGB has been described. However, the LUT only needs to be an array (parameter set) that defines a correspondence relationship before and after color information for each pixel in input image is converted, and is not limited to a table having output color data corresponding one-to-one to any input color data.

For example, when the input color data is not registered in the LUT as an input value, the image processor 120 may estimate output color data by a known estimation method such as tetrahedron interpolation. As described above, the LUT may include a formula that defines how to adjust color information of each pixel of input image data to be the color information of the pixel of output image data. Alternatively, the LUT may not include the table as described above, and may be represented only by the formula as described above. In addition, the LUT is not limited to the three-dimensional lookup table, and may be a lookup table having one or more dimensions.

4-5. Fifth Modification

In the first embodiment, the digital camera has been described as an example of the imaging apparatus, but the imaging apparatus is not limited thereto. The imaging apparatus of the present disclosure may be an electronic device (for example, a video camera, a smartphone, a tablet terminal, or the like) having an image photographing function.

5. Example of Aspects

Hereinafter, various aspects according to the present disclosure will be listed.

<Aspect 1>
An imaging apparatus comprising:
an imaging sensor configured to capture a subject image to generate original image data;
an image processor configured to perform image processing to generate image data, the image processing providing the original image data with a predetermined effect;
a storage configured to store a plurality of first parameter sets each defining the effect in the image processing, at least one second parameter set defining a correspondence before and after color information in an image is converted, and designation information for designating one of the plurality of first parameter sets combined with each of the at least one second parameter set; and
a controller configured to set a specific first parameter set combined with a specific second parameter set to one of the plurality of first parameter sets designated in the designation information when reading the specific second parameter set in the at least one second parameter set from the storage.

<Aspect 2>
The imaging apparatus according to aspect 1, wherein
the storage stores data including the specific second parameter set and the designation information, and
the controller reads the designation information when reading the specific second parameter set, and sets the specific first parameter set combined with the specific second parameter set to one of the plurality of first parameter sets designated in the designation information.

<Aspect 3>
The imaging apparatus according to aspect 1 or 2, wherein
the image processor adjusts an image indicated by the original image data by using the specific first parameter set, and converts color information included in the image adjusted by the specific first parameter set by using the specific second parameter set to generate image data.

<Aspect 4>
The imaging apparatus according to any of aspects 1 to 3, further comprising:
a user interface configured to receive a user operation; and
a display configured to display information, wherein
when the specific first parameter set is set, the controller causes the display to display information indicating that a user is not able to change the specific first parameter set to another first parameter set using the user interface.

<Aspect 5>
The imaging apparatus according to any of aspects 1 to 4, further comprising:
a user interface configured to receive a user operation; and
a display configured to display information, wherein
when the specific first parameter set is set, the controller causes the display to display information indicating at least one parameter included in the specific first parameter set and adjustable by the user operation.

<Aspect 6>
An information processing method performed by a processor, the information processing method comprising:
acquiring image data generated by giving a predetermined effect by image processing to original image data generated by capturing a subject image, the image data including information indicating a first parameter set defining the effect;
receiving a user operation of converting color information of the image data;
generating a second parameter set defining a correspondence relationship before and after conversion of color information of the image data by the user operation; and
generating data including the generated second parameter set and information indicating the first parameter set.

<Aspect 7>
An information processing method performed by a processor, the information processing method comprising generating data including a second parameter set and designation information by acquiring the second parameter set to be applied to original image data in image processing together with the designation information designating a first parameter set defining a predetermined effect given by the image processing to the original image data generated by capturing a subject image.

The present disclosure is applicable to various imaging apparatuses.

What is claimed is:
1. An imaging apparatus comprising:
an imaging sensor configured to capture a subject image to generate original image data;
an image processor configured to perform image processing to generate image data, the image processing providing the original image data with a predetermined effect;
a storage configured to store a plurality of first parameter sets each defining the effect in the image processing, at least one second parameter set defining a correspondence before and after color information in an image is converted, and designation information for designating one of the plurality of first parameter sets combined with each of the at least one second parameter set; and
a controller configured to set a specific first parameter set combined with a specific second parameter set to one of the plurality of first parameter sets designated in the designation information when reading the specific second parameter set in the at least one second parameter set from the storage.

2. The imaging apparatus according to claim 1, wherein
the storage stores data including the specific second parameter set and the designation information, and
the controller reads the designation information when reading the specific second parameter set, and sets the specific first parameter set combined with the specific second parameter set to one of the plurality of first parameter sets designated in the designation information.

3. The imaging apparatus according to claim 1, wherein
the image processor adjusts an image indicated by the original image data by using the specific first parameter set, and converts color information included in the image adjusted by the specific first parameter set by using the specific second parameter set to generate image data.

4. The imaging apparatus according to claim 1, further comprising:

a user interface configured to receive a user operation; and a display configured to display information, wherein when the specific first parameter set is set, the controller causes the display to display information indicating that a user is not able to change the specific first parameter set to another first parameter set using the user interface.

5. The imaging apparatus according to claim 1, further comprising:

a user interface configured to receive a user operation; and a display configured to display information, wherein when the specific first parameter set is set, the controller causes the display to display information indicating at least one parameter included in the specific first parameter set and adjustable by the user operation.

6. The imaging apparatus according to claim 2, further comprising:

a user interface configured to receive a user operation; and a display configured to display information, wherein when the specific first parameter set is set, the controller causes the display to display information indicating at least one parameter included in the specific first parameter set and adjustable by the user operation.

7. The imaging apparatus according to claim 3, further comprising:

a user interface configured to receive a user operation; and a display configured to display information, wherein when the specific first parameter set is set, the controller causes the display to display information indicating at least one parameter included in the specific first parameter set and adjustable by the user operation.

8. The imaging apparatus according to claim 4, further comprising:

a user interface configured to receive a user operation; and a display configured to display information, wherein when the specific first parameter set is set, the controller causes the display to display information indicating at least one parameter included in the specific first parameter set and adjustable by the user operation.

9. An information processing method performed by a processor, the information processing method comprising:

acquiring image data generated by giving a predetermined effect by image processing to original image data generated by capturing a subject image, the image data including information indicating a first parameter set defining the effect;

receiving a user operation of converting color information of the image data;

generating a second parameter set defining a correspondence relationship before and after conversion of color information of the image data by the user operation, the second parameter set including conversion data used to convert the color information of the image data; and generating data including the generated second parameter set and information indicating the first parameter set embedded within the generated second parameter set.

10. An information processing method performed by a processor, the information processing method comprising generating data including a second parameter set and designation information embedded within the second parameter set by acquiring the second parameter set to be applied to original image data in image processing together with the designation information designating a first parameter set defining a predetermined effect given by the image processing to the original image data generated by capturing a subject image, the second parameter set including conversion data used to convert the color information of the image data.

* * * * *